(12) United States Patent
Dennison et al.

(10) Patent No.: US 8,686,326 B1
(45) Date of Patent: Apr. 1, 2014

(54) OPTICAL-FLOW TECHNIQUES FOR IMPROVED TERMINAL HOMING AND CONTROL

(75) Inventors: John C. Dennison, Healdsburg, CA (US); David C. Campion, Agoura Hills, CA (US)

(73) Assignee: Arete Associates, Northridge, CA (US)

( * ) Notice: Subject to any disclaimer, the term of this patent is extended or adjusted under 35 U.S.C. 154(b) by 287 days.

(21) Appl. No.: 12/383,638

(22) Filed: Mar. 25, 2009

Related U.S. Application Data

(60) Provisional application No. 61/072,028, filed on Mar. 26, 2008.

(51) Int. Cl.
| | | |
|---|---|---|
| *F42B 15/01* | (2006.01) | |
| *F41G 7/22* | (2006.01) | |
| *G01S 13/93* | (2006.01) | |
| *G01S 15/93* | (2006.01) | |
| *G01S 17/93* | (2006.01) | |
| *F42B 15/00* | (2006.01) | |
| *F41G 7/00* | (2006.01) | |
| *G01S 13/00* | (2006.01) | |
| *G01S 15/00* | (2006.01) | |
| *G01S 17/00* | (2006.01) | |

(52) U.S. Cl.
USPC ......... 244/3.16; 701/1; 701/3; 701/4; 701/11; 701/400; 701/408; 701/300; 701/301; 701/302; 367/87; 367/95; 367/96; 244/3.1; 244/3.11; 244/3.15; 244/3.17; 342/52; 342/53; 342/54; 342/55; 342/61; 342/62; 342/63; 342/66; 342/70; 342/175; 342/195; 382/100; 382/103; 382/104

(58) Field of Classification Search
USPC ........ 244/3.1–3.3; 701/1–18, 23, 27, 28, 400; 701/408, 300–302; 102/206, 211, 213; 342/52–55, 61–66, 175, 195, 70–72; 180/167–169; 367/87, 95–105; 382/100–107
See application file for complete search history.

(56) References Cited

U.S. PATENT DOCUMENTS 2,903,204 A * 9/1959 Nyman et al. ............... 244/3.16
2,911,167 A * 11/1959 Null et al. .................... 244/3.16
(Continued)

OTHER PUBLICATIONS

G.L. Barrows et al., "Mixed-Mode VLSI Optic Flow sensors for In-Flight Control of a Micro Air Vehicle." Critical Technologies for the Future of Computing, SPIE vol. 4109(2000).

(Continued)

*Primary Examiner* — Bernarr Gregory
(74) *Attorney, Agent, or Firm* — Furman IP Law

(57) ABSTRACT

In certain aspects, this invention is a "control system" that detects and minimizes (or otherwise optimizes) an angle between vehicle centerline (or other reference axis) and vehicle velocity vector—as for JDAM penetration. Preferably detection is exclusively by optical flow (which herein encompasses sonic and other imaging), without data influence by navigation. In other aspects, the invention is a "guidance system", with optical-flow subsystem to detect an angle between the vehicle velocity vector and line of sight to a destination—either a desired or an undesired destination. Here, vehicle trajectory is adjusted in response to detected angle, for optimum angle, e.g. to either home in on a desired destination or avoid an undesired destination (or rendezvous), and follow a path that's ideal for the particular mission—preferably by controlling an autopilot or applying information from navigation. Purposes include real-time angle optimization to improve autopilots or guidance, and vehicle development or testing.

40 Claims, 4 Drawing Sheets
(4 of 4 Drawing Sheet(s) Filed in Color)

(56) References Cited

U.S. PATENT DOCUMENTS

| | | | | |
|---|---|---|---|---|
| 3,564,257 | A | * | 2/1971 | Berry et al. .................. 244/3.16 |
| 3,820,742 | A | | 6/1974 | Watkins |
| 4,020,339 | A | * | 4/1977 | Gustafson .................... 244/3.16 |
| 4,093,154 | A | * | 6/1978 | McLean ........................ 244/3.16 |
| 4,123,019 | A | * | 10/1978 | Amberntson .................. 244/3.2 |
| 4,168,813 | A | * | 9/1979 | Pinson et al. ................. 244/3.16 |
| 4,195,799 | A | * | 4/1980 | Sogo et al. ................... 244/3.13 |
| 4,339,097 | A | * | 7/1982 | Kordulla et al. ............. 244/3.16 |
| 4,699,332 | A | * | 10/1987 | Bigot et al. .................. 244/3.11 |
| 4,750,688 | A | | 6/1988 | Davies |
| 4,796,834 | A | * | 1/1989 | Ahlstrom ..................... 244/3.16 |
| 4,881,270 | A | * | 11/1989 | Knecht et al. ................ 244/3.17 |
| 4,898,341 | A | * | 2/1990 | Terzian ........................ 244/3.16 |
| 4,905,151 | A | * | 2/1990 | Weiman et al. ................. 701/28 |
| 4,917,330 | A | * | 4/1990 | Dulat et al. ................... 244/3.16 |
| 5,128,874 | A | * | 7/1992 | Bhanu et al. .................. 701/301 |
| 5,201,895 | A | * | 4/1993 | Grosso ......................... 244/3.16 |
| 5,211,356 | A | * | 5/1993 | McWilliams et al. ....... 244/3.15 |
| 5,323,987 | A | * | 6/1994 | Pinson ......................... 244/3.16 |
| 5,341,142 | A | * | 8/1994 | Reis et al. ...................... 342/64 |
| 5,613,650 | A | * | 3/1997 | Kaifu et al. ................... 244/3.16 |
| 5,647,560 | A | * | 7/1997 | Schnatz et al. ............... 244/3.15 |
| 5,660,355 | A | * | 8/1997 | Waymeyer .................... 244/3.15 |
| 5,836,540 | A | * | 11/1998 | Romer et al. ................. 244/3.16 |
| 5,932,833 | A | * | 8/1999 | Hammon et al. ............. 102/213 |
| 6,006,145 | A | * | 12/1999 | Bessacini ......................... 701/1 |
| 6,081,605 | A | * | 6/2000 | Roth et al. .................... 382/103 |
| 6,181,988 | B1 | * | 1/2001 | Schneider et al. ................ 701/3 |
| 6,410,897 | B1 | * | 6/2002 | O'Neill ........................ 244/3.16 |
| 6,411,871 | B1 | * | 6/2002 | Lin ................................. 701/27 |
| 6,581,870 | B1 | * | 6/2003 | Runne et al. ................... 244/3.1 |
| 6,672,533 | B1 | * | 1/2004 | Regebro ....................... 244/3.13 |
| 6,978,965 | B1 | * | 12/2005 | Hartmann et al. ........... 244/3.16 |
| 7,083,139 | B2 | * | 8/2006 | Broekaert .................... 244/3.11 |
| 7,149,608 | B2 | * | 12/2006 | Itoh et al. .......................... 701/1 |
| 7,183,966 | B1 | * | 2/2007 | Schramek et al. .............. 342/53 |
| 8,135,176 | B2 | * | 3/2012 | Wuerz-Wessel et al. ..... 382/107 |
| 8,155,802 | B1 | * | 4/2012 | Rosenfeld .......................... 701/4 |

OTHER PUBLICATIONS

Randall W. Beard, "Vision Aided Proportional Navigation . . . ", AIAA Guidance, Navigaiton and Control Conference and Exhibit, AIAA 2007-6609, Aug. 20-23, 2007 :1-15.

Jun-Sik Kim et al, "Motion Estimation using Multiple Non-Overlapping Cameras . . . ", 2008 IEEE International Conference on Robotics and Automation, May 19-23, 2008: 3076-3081.

Paul L. Vergez et al., "Optimal Control and Estimation for Strapdown Seeker Guidance of Tactical Missiles.", J. Guidance vol. 5, No. 3 May-Jun. 1982: 225-226.

Jacques Waldmann, "Line-of-Sight Rate Estimation and Linearizing Control of an Imaging . . . ", IEEE Transactions on Control Systems Technology vol. 10, No. 4 Jul. 2002: 556-567.

Steven R. Wassom et al., "Intergrated Aerofin/Thrust Vector Control for Tactical Missiles.", Journal of Propulsion and Power 1991 0748-4658 vol. 7, No. 3: 374-381.

Jiang-Guo Zhang et al., "Line of Sight Rate Estimation of Strapdown . . . ", The Fourth International Conference on Machine Learning and Cybernetics.,Aug. 18-21, 2005: 1574-1578.

Patrick Costello, "Simulink Simulation of Proportional Navigation and Command to Line of Sight Missile Guidance.", MA thesis, Naval Postgraduate School, Mar. 1995, 1-88.

* cited by examiner

OPTICAL-FLOW TECHNIQUES FOR IMPROVED TERMINAL HOMING AND CONTROL

RELATION BACK

We claim the priority benefit of coowned U.S. Provisional Patent Application 61/072,028, which was filed Mar. 26, 2008 in our names—and is wholly incorporated by reference into this document.

FIELD OF THE INVENTION

This invention relates generally to the field of "guidance and control"—and more specifically to use of optical-flow stratagems for enhancing final results in this field.

In this field the term "control" usually refers to "attitude" control, meaning control of the orientation of a vehicle, most commonly but not necessarily an aircraft. The desirability of attitude control arises in special circumstances that will be introduced shortly.

In this field, further, the term "guidance" usually means adjusting the path or route of a vehicle to lead precisely to a specified destination. In most practical applications, for present purposes, guidance precision is preferably finer than one meter.

For purposes of definiteness and simplicity in this document, including the appended claims:
  the word "navigation" is limited to determining current location of a vehicle (together with its velocity and orientation), while
  guidance relates instead to a desired location, and
  control relates to orientation of a vehicle as it approaches that place.
(Our above working definition of navigation diverges from both popular or common usage—which generally encompasses guidance—and the ubiquitous, universally accepted technical term "Proportional Navigation", which very strictly speaking could be better termed "proportional guidance".)

As will be seen, guidance and control based on navigation—even though very powerful tools—inherently are subject to several distinct limitations described below. Our invention mitigates or removes these limitations.

As used in this document the word "terminal" refers to final phases of a path, most typically but not necessarily the last few seconds or milliseconds of movement toward a destination. "Terminal" adjustments thus effectuate extremely fine but sometimes critical refinements in vehicular orientation or position (again, a function often commonly attributed to navigation and to Proportional Navigation). The word "homing" may be understood as very generally synonymous with "guidance".

"Optical flow" is a known way of processing sequential images (for example the sequence of essentially still frames that make up a video or motion picture), to compute "speed" of an element in the images—commonly expressed in pixels per second of motion across or up-and-down in a digital display screen. Heretofore, we believe, little or no use of optical flow is known in guidance and control as above defined. Optical flow is, however, a relatively common adjunct to GPS navigation; more specifically, optical flow is sometimes used to provide an additional feature—for instance, to obtain some range data from the quotient of velocity and range, combined with velocity.

For purposes of this document the term "optical" is not limited to phenomena involving visible radiation. Rather it also encompasses phenomena pertaining to infrared and other radiation wavelengths.

In some very special cases, as will be clear particularly from the context of certain of the appended claims, the term "vehicle" encompasses what can be attached to a parachute or other device for controlled or partially controlled movement, through the air or otherwise. Merely by way of example, an individual paratrooper, or a packet or sled carrying articles, can be a "vehicle" for purposes of certain of the appended claims.

Such movement is not necessarily powered, but rather can be gliding or the like—including even garments with airfoils formed e.g. between the user's legs, or between arms and torso, as nowadays are well established in relatively extreme sporting flight. As to all the special cases introduced here, the point is that such situations are amenable to enhancement of delivery precision and accuracy, through the techniques of our invention.

BACKGROUND

Our invention is useful in many civilian and military applications. Known usages range from search-and-rescue situations requiring parachute or other aerial drops of emergency supplies, and police operations needing prompt delivery of nonlethal weapons such as large nets or tasers (from helicopters or drones), and through paratrooper tactical planning, to attack devices—e.g. guided missiles or munitions.

In one such known application, ideally but not exclusively for airborne vehicles, the angle of the velocity vector relative to the platform (vehicle) centerline is used to align the platform to its own motion. Such alignment has particular utility in connection with certain kinds of very well-known military attack hardware.

Most such hardware already has an attitude-correction autopilot, in which case the misalignment angle can simply be is provided as an input to that autopilot—which then effectuates the desired correction. The purpose of such alignment is closely related to the specific type of military hardware involved. Generally such hardware is of so-called "bunker busting" types, which are intended to penetrate hardened opponent installations.

If the tip of a bunker buster is pointed directly forward, penetration typically is much deeper than when the tip is oriented even slightly sideways. In the latter case, the vehicle behaves somewhat more like a blunt object, delivering a blow that may be dissipated in surface shattering, rather than yielding the desired deep penetration.

In a second such known optical-flow strategy, more broadly useful than the military application just outlined, a destination (e.g. impact point) defined in collected images is provided to guidance algorithms for terminal homing accuracy improvement. The analysis in this case is intended simply to greatly refine precision and accuracy in reaching the destination.

Even though such systems can sometimes or even often work very well, they are overall unsatisfactory. The reason is that heretofore a starting point for such guidance and control applications generally has been data derived from "navigation"—specifically meaning determining present location, through use of certain kinds of equipment.

Such equipment can include a GPS system, or an inertial system (most typically mechanical or optical gyroscopes), or in earlier eras sightings of the sun and other celestial objects using transits or more-modern equivalents. Navigation is limited, as ever it has been, to finding of a current location—leaving it to people and their artificial aids to divine where to go next, and how to get there.

Reliance on navigation is often problematic because suitable navigation equipment is often unavailable or functionally inadequate—and for some purposes can be overly bulky, heavy or expensive—or combinations of these.

For example traditional navigation relies upon tedious manual methods that are far too slow for modern automated terminal-approach situations. Current-day navigation methods such as global positioning systems, though much faster, may yet fail to be suitable for accurate homing.

As a further example, a GPS-guided vehicle can have a bias in its navigation solution, and this can throw the guidance off severely. In areas where GPS functionality is denied or degraded, operators may have a photographic image but not full coordinates of the desired destination point. (Present technology fails to fully exploit availability of such an image, in producing accurate guidance solutions without aid by navigation.)

A problem with some such approaches is that angular-attitude accuracy is often insufficient to meet alignment requirements for penetrating-munition alignment. Another method is to use accelerometer data from an INS/GPS system. Having the autopilot command the munition to zero acceleration drives the so-called "angle of attack" to zero; however, that is an aerodynamic angle of attack, not the angle between the inertial velocity and the munition. A moderate crosswind puts the munition into an out-of-specification condition.

Certain previously known forms of optical-flow analysis have been used for vehicle guidance and control, particularly in ground vehicles. In that context, the optical-flow variant known as "structure through flow" has been applied to generate three-dimensional ("3D") maps of the environment of a vehicle.

Then when the environment is sufficiently mapped, ground-vehicle guidance computers can make intelligent steering decisions based on such mappings. Use of optical-flow mapping in ground vehicles, in this way, may be regarded as very loosely analogous to the basing of other kinds of optical-flow procedures upon navigation as mentioned above. Accordingly these usages—which are not the present invention—require navigation or analogous external information sources, and as noted above these are often infeasible, inconvenient or unavailable.

Thus in many situations there is a profound need for faster and more precise guidance and control. Although earlier efforts toward solving this need have been praiseworthy, the prior art has left considerable room for refinement.

SUMMARY OF THE DISCLOSURE

The present invention provides just such refinement. The invention has several main independent aspects, or facets, which are capable of use independently of one another—but also can be practiced in combination together.

In preferred embodiments of a first of its aspects or facets, the invention is a control system, for a vehicle that has a reference axis and that while in motion has a velocity vector. The control system includes an optical-flow subsystem that detects an angle between the reference axis and the velocity vector; and a vehicle orientation-adjustment subsystem responding to the detected angle, to optimize the detected angle.

The foregoing may represent a description or definition of the first aspect or facet of the invention in its broadest or most general form. Even as couched in these broad terms, however, it can be seen that this facet of the invention importantly advances the art.

In particular, this aspect of our invention achieves optimization of vehicle attitude—with respect to a vehicle's own velocity vector—based simply on operation of an optical-flow analyzer, without more. More specifically, nothing in the foregoing description suggests need for an appended navigation capability.

Although the first major aspect of the invention thus significantly advances the art, nevertheless to optimize enjoyment of its benefits preferably the invention is practiced together with certain additional features or characteristics. One such preference is that the orientation-adjustment subsystem (i.e., the "control" function of the vehicle) be substantially not influenced by, and substantially not reliant upon information from, any navigation apparatus or algorithm.

There are several other basic preferences. We prefer that:
the reference axis be a centerline of the vehicle;
the orientation-adjustment subsystem include means for minimizing the detected angle;
alternatively, the orientation-adjustment subsystem include means for adjusting the detected angle to a specific value or range of values;
the orientation-adjustment subsystem comprise means for providing data to an autopilot to guide the vehicle on a terminal path; and
the terminal path be a specific, precise path.

As will be recalled, for purposes of this document the term "vehicle" encompasses not only aircraft and ground vehicles, and not only powered transportation devices, but also creatures (e.g. people) or things attached to parachutes or other passive controlled-movement devices. Thus other preferences are that:
the vehicle comprise a parachute or other controlled-movement device, such as a controlled-descent device—in which case it is further preferred that the vehicle comprise one or more of:
a living being, such as a paratrooper or rescue dog; and
a sled or packet carrying supplies, such as medical provisions.

Another basic preference, particularly applicable for the control system of the first aspect of the invention when the vehicle approaches a destination region, is that the optical-flow subsystem include an imaging unit secured to the vehicle; and some means for causing the imaging unit to form a succession of images of the destination region. Here the apparatus also preferably includes some means for receiving and analyzing the succession of images.

In this latter case we prefer that:
the imaging unit include a camera; and/or
the imaging unit include one or more of a radar, lidar (or ladar) module; or a sonar module, IR imager or other electrooptical imager.

Also in the case of an imaging unit forming successive images of the destination region, we prefer that the receiving means include one or more of a multipurpose digital processor, a field-programmable gate array, and analog circuits. Three other basic preferences are that:
particularly if the vehicle is an airborne vehicle, the apparatus further include an autopilot controlled by the orientation-adjustment subsystem;
particularly if the vehicle is an airborne vehicle that is a penetrating munition, the orientation-adjustment subsystem extend depth of penetration of the munition;

particularly if the vehicle is a ground vehicle, it further include an autopilot controlled by the orientation-adjustment subsystem.

In preferred embodiments of its second major independent facet or aspect, the invention is a guidance system, for a vehicle that has a destination and that while in motion has a velocity vector. The guidance system includes an optical-flow subsystem detecting an angle between the velocity vector and a line of sight to the destination; and a vehicle trajectory-adjustment subsystem responding to the detected angle, to modify the velocity vector so as to optimize the detected angle.

The foregoing may represent a description or definition of the second aspect or facet of the invention in its broadest or most general form. Even as couched in these broad terms, however, it can be seen that this facet of the invention importantly advances the art.

In particular, this aspect of our invention achieves optimization of vehicle path—with respect to a vehicle's established destination—based simply on operation of an optical-flow analyzer, without more. Thus the benefits introduced above in regard to vehicle "control" (i.e. attitude control) are here extended to vehicle "guidance". More specifically, nothing in the foregoing description suggests need for an appended navigation capability.

Although the second major aspect of the invention thus significantly advances the art, nevertheless to optimize enjoyment of its benefits preferably the invention is practiced in conjunction with certain additional features or characteristics. One such preference—as in the case of the previously discussed first main facet of the invention—is that the trajectory-adjustment subsystem (i.e., the guidance function of the vehicle) be substantially not influenced by, and substantially not reliant upon information from, any navigation apparatus or algorithm.

In other basic preferences, the trajectory-adjustment subsystem comprises:
    some means for minimizing the detected angle; and/or
    some means for applying information from a navigation unit or algorithm, in optimizing the detected angle; or
    when the vehicle has a particular type of mission, some means for modifying the vector to provide a path to the destination that is optimally suited to the mission;
or combinations of these features.

Another basic preference as to the second major aspect of the invention, particularly for use as the vehicle approaches the destination, is that the optical-flow subsystem include:
    imaging apparatus secured to the vehicle; and
    some means for causing the imaging apparatus to form a succession of images of the destination; and
    some means for receiving and analyzing the succession of images.

Yet other preferences are that the imaging apparatus include one or more of: a camera; radar, lidar (or ladar) module; or a sonar module, IR imager or other electrooptical imager.

In preferred embodiments of its third major independent facet or aspect, the invention is a guidance system, for a vehicle that operates in relation to another object or to a particular undesired destination, and that while in motion has a velocity vector. The guidance system includes an optical-flow subsystem detecting an angle between the velocity vector and a line of sight to the other object or particular destination; and a vehicle trajectory-adjustment subsystem responding to the detected angle, to modify the velocity vector so as to optimize the detected angle for avoidance of the other object or particular undesired destination. Thus our invention is equally applicable to avoiding, as well as to facilitating, many forms of vehicular encounter—whether destructive or rendezvous/landing.

The foregoing may represent a description or definition of the third primary aspect or facet of the invention in its broadest or most general form. Even as couched in these broad terms, however, it can be seen that this facet of the invention importantly advances the art.

In particular, this aspect of the invention is the first system to extend to vehicle avoidance, crash avoidance and prevention of undesired delivery destinations, the benefits of greatly simplified analysis based upon optical flow.

Although the third major aspect of the invention thus significantly advances the art, nevertheless to optimize enjoyment of its benefits preferably the invention is practiced in conjunction with certain additional features or characteristics. In particular, once again we here make it explicit that preferably no navigation algorithm or apparatus has any influence upon the operation of this facet of our invention.

In preferred embodiments of its fourth main independent facet or aspect, the invention is a guidance system for a vehicle that is under engineering development or testing, or both; or that is for operation with an autopilot or a guidance algorithm, or both; or is under combinations of these circumstances; and that while in motion has a velocity vector. The guidance system includes an optical-flow subsystem detecting an angle between the velocity vector and a line of sight to another object, or to a particular destination that is either desired or to be avoided; and a vehicle trajectory-response subsystem responding to the detected angle—to report or modify, or both, the velocity vector so as to:
    optimize the detected angle for real-time measurement input to improve performance and robustness of the autopilot or the guidance algorithm, or both, or
    guide the engineering development or testing of air vehicles, or both.

The foregoing may represent a description or definition of the fourth aspect or facet of the invention in its broadest or most general form. Even as couched in these broad terms, however, it can be seen that this facet of the invention importantly advances the art.

In particular, this aspect of our invention is the first system that extends the benefits of simple optical-flow analysis to preoperational phases of vehicle R&D and testing, as well as related autopilot and guidance-algorithm development.

The foregoing characteristics and benefits of our invention will be more fully understood from the following discussions—considered together with the accompanying drawings, of which:

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF PREFERRED EMBODIMENTS

Figure 1:
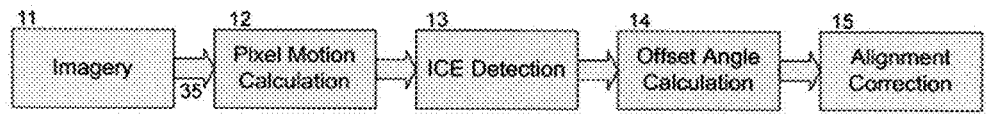
FIG. 1 is an image-processing algorithm flowchart.

Preferred embodiments of our invention apply optical-flow image processing for certain terminal-phase guidance-and-control refinements. In these optical-flow strategies, images from a body-fixed camera unit (i.e., a camera fixed directly or indirectly to the vehicle) are analyzed and the results used to precisely determine certain critical angles that enable the desired refinements as detailed below.

In two such optical-flow strategies, which replace the two primary navigation-based methods detailed in the "BACKGROUND" section above, the velocity vector can be aligned relative to the platform (i.e. vehicle) centerline—or to a destination vector, respectively. These strategies thus substantially eliminate the several difficulties outlined in the "BACKGROUND" section above, in particular solving the bunker-busting and destination-precision problems mentioned earlier, and doing so without help from a gyrostabilized imaging seeker or other navigation apparatus.

Using a priori knowledge of the target location in a stored image file, a strapdown imaging sensor can determine the angle between a velocity vector and a desired aimpoint in the image. In a "bunker busting" application the result can be a deeply penetrating crater (as described earlier), rather than only a superficial shattering, in an opponent facility. In a guidance application the result can be geographically very precise delivery for virtually any kind of craft. In the military world these concepts apply to Cruise missiles, and to "JDAMs" ("Joint Direct Attack Munitions"), which are used by several military organizations—and, indeed, to many different kinds of unmanned airborne vehicle ("UAV").

Such benefits are readily extended into other platform applications, including autonomous or aided landing of non-destructive air vehicles—as well as indirect homing, such as the parachute drops and other delivery situations enumerated above. Optical flow provides both a direct measurement of aircraft sideslip angle (so-called "crab angle") and a predicted touchdown point or destination in the landing zone. All such measurements are useful for robust autopilot and guidance performance.

Ground vehicles, as well as airborne craft, can advantageously utilize our invention. The same concepts set forth above with regard to munitions also aid autonomous unmanned ground-vehicle terminal guidance (e.g. for entrances to caves or in approaching windows or doorways).

Nearly all such usages can be improved through optical-flow algorithms, particularly those according to our invention. These applications can apply optical flow to determine an inertial navigation solution (three position states, three attitude states, and three velocity states), when GPS updates are not available.

As noted earlier, our invention is different from prior art in that it does not rely on a navigation solution. Instead it directly measures angles between:

(1) a velocity vector and the airframe centerline, for control correction, and (2) a velocity vector and a scene-based destination point—essentially on the ground—for guidance correction.

Our invention further differs from prior strategies such as "structure through flow"—also mentioned earlier. Our invention differs from that prior work in that we use optical flow to steer a vehicle to a desired destination point on a hillside, building, or other standing object. Information derived from optical-flow algorithms replaces the measurements used in gyrostabilized imaging seekers and the like.

A preliminary objective of our image-based homing and control invention is to accurately measure the angle between a velocity vector of a vehicle and the other two above-stated reference directions. To accomplish such objectives, a camera is fixed to the vehicle, most typically to its nose, and is accurately aligned to the body (again, ideally to the centerline).

Doing this ensures that the center of the imagery corresponds to the pointing direction of the vehicle. Using only this simple imaging unit together with modest analytical programming, our invention is able to accurately determine any offset angle between the velocity and "look" vectors of the vehicle. (By "look" vector we mean the direction in which the vehicle and thus the camera are pointing.)

Preferred embodiments of our invention exploit the fact that a pixel, in the imagery, that corresponds to the velocity vector exhibits unique and easily identifiable features when processed temporally. More specifically, as the craft flies toward the ground, the overall image expands away from a cents ter of expansion.

The latter point is sometimes called—somewhat less precisely—the "centroid" of expansion. The center of expansion is the target point of the look vector, which is also the aim point of the velocity vector.

Once our invention has detected the location of this center of expansion in the imagery, the system can easily go on to calculate the necessary offset angles for input to an alignment-correction subsystem. The overall technique involves three relatively simple steps described in greater detail below: pixel motion calculation 12 (FIG. 1), image center-of-expansion (ICE) detection 13, and offset angle calculation 14.

PIXEL MOTION CALCULATION—From one frame to the next, each pixel in the image moves away from the aim point of the craft. (It is commonly said that "each pixel expands away" from the aim point; however, it will be appreciated that, to be more precise semantically, it is the overall image, not in general an individual pixel, that "expands away". Even though a pixel does have a certain small areal extent and therefore is capable of expansion, the crux of the matter seems better articulated in terms of expansion-away of the image.)

We can effectively quantify this by using an optical-flow algorithm to find how the content of each pixel moves between frames (pixels per se do not move). The basic idea of optical flow is to estimate the motion of the content of each pixel in an image sequence. The algorithm inputs two images 11, separated in time, and outputs two arrays 15 corresponding to the motion along the x and y axes (in units of pixels per update).

Most, if not all, optical-flow algorithms are based on the constraint that the brightness of each object in the scene is constant in time, regardless of its motion. This assumes that there are no lighting changes across an image (e.g. moving shadows) and that an object will not change its intrinsic brightness.

For the types of motion usually considered, sudden lighting changes are not likely to be a significant issue. Further, the brightness of the types of objects typically seen by a UAV camera (e.g. landscapes, buildings, trees, cars) generally does not change over short time scales.

The constant-brightness constraint is expressed as:

$$\frac{dE}{dt} = 0$$

where E is the brightness (or "pixel value") of a particular object in the image. Applying the chain rule for differentiation yields:

$$\frac{\partial E}{\partial x}\frac{dx}{dt} + \frac{\partial E}{\partial y}\frac{dy}{dt} + \frac{\partial E}{\partial t} = 0.$$

Upon substituting $v_x$ and $v_y$ for the velocities in x and y, respectively, and rewriting that equation in vector notation:

$$\left(\frac{\partial E}{\partial x}, \frac{dx}{dt}\right) \cdot (v_x, v_y) = -\frac{\partial E}{\partial t}.$$

The brightness partial derivatives can be calculated from the imagery and the velocities; and $v_x$ and $v_y$ are the unknowns for which we wish to solve—but there are two unknowns and only the one equation above. As can be appreciated from study of the equation, this is the component of motion along the direction of the brightness gradient.

Calculation of another component of motion, ideally an orthogonal component, requires an additional constraint. The main difference between various optical-flow algorithms is the is particular second constraint used.

Our invention is independent of the second constraint used, in the sense that the present invention can produce valid guidance and control results regardless of the "second" constraint that is adopted. This condition is true, provided only that the constraint reflects with reasonable accuracy the physical realities of the vehicle operations that will eventually be guided or controlled.

One such algorithmic constraint that we have found satisfactory was first proposed by Horn & Schunck in "Determining Optical Flow," 17 *Artificial Intelligence* 185-203 (1981). Their algorithm introduces a smoothness constraint, namely an assumption that neighboring points in an image have similar velocities. The algorithm accomplishes this by minimizing the square of the magnitude of the gradient of the optical flow velocity:

$$\left(\frac{\partial v_x}{\partial x}\right)^2 + \left(\frac{\partial v_x}{\partial y}\right)^2 \text{ and } \left(\frac{\partial v_y}{\partial x}\right)^2 + \left(\frac{\partial v_y}{\partial y}\right)^2.$$

These constraints can be used to derive the iterative expression:

$$v_x^{n+1} = \bar{v}_x^n - \frac{\partial E}{\partial x}\Delta v \quad \Delta v \equiv \frac{\left(\frac{\partial E}{\partial x}\bar{v}_x^n + \frac{\partial E}{\partial y}\bar{v}_y^n + \frac{\partial E}{\partial t}\right)}{\alpha^2 + \left(\frac{\partial E}{\partial x}\right)^2 + \left(\frac{\partial E}{\partial y}\right)^2}.$$
$$v_y^{n+1} = \bar{v}_y^n - \frac{\partial E}{\partial y}\Delta v$$

The overbars denote local averages of the velocity fields, and the alpha-squared term is a constant that weights the relative importance of each constraint.

DETECTION OF THE IMAGE CENTER OF EXPANSION (ICE)—We then use the motion vector at each pixel to calculate magnitude of the motion, representing the net shift for the content of each pixel between updates. Points farthest from the ICE move fastest; and points closest to the ICE, slowest.

The location of minimum optical-flow magnitude corresponds to the location of the ICE. This position is very easily identified.

$$v(x,y) = \sqrt{v_x(x,y)^2 + v_y(x,y)^2}$$

$(x_{ICE}, y_{ICE})$=position where v=min(v)

OFFSET ANGLE CALCULATION—The last step relates the pixel location of the ICE to offset angles that can be input to the alignment-correction subsystem of the vehicle. The relationship between ICE location and angular offset is expressed as:

$$\theta_{is} = \sqrt{x_{ICE}^2 + y_{ICE}^2} \cdot \text{IFOV}.$$

The so-called "instantaneous field of view" ("IFOV") is the angular resolution of a single pixel. This terminology arose in the context of earlier scanning sensors that considered each pixel successively, one at a time—and hence nowadays in an array-sensor context is more accurately replaced by "per-pixel field of view" ("PPFOV").

For a narrow field of view ("FOV"), the PPFOV can be approximated as the FOV divided by the number of pixels. This is the angular correction that must be applied to a vehicle. The relationship between ICE and azimuth is expressed as:

$$Az = \arctan\left(\frac{y_{ICE}}{x_{ICE}}\right).$$

Since the azimuth represents the direction of an undesired offset, the correction is applied opposite to the azimuth direction.

Figure 2:
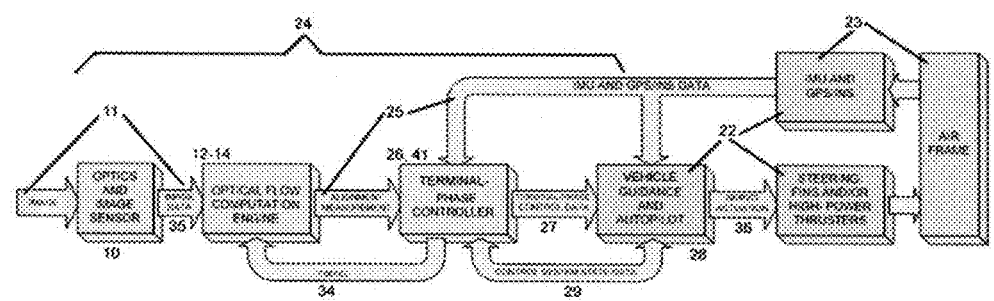
FIG. 2 is a simplified block diagram of a control system.

Electrical & Software Architecture:

The system that we now most highly prefer for our invention includes existing control structure 22 (FIG. 2) and physical elements 23 of a vehicle (e.g. munition), as well as components 24 that we add to provide sensory data 25 and manipulation of the terminal or impact phase 26 of the vehicle mission—and an airframe interface between the existing and new features, 22-23 and 24-26 respectively.

Digital imagery is presented to the optical-flow computation engine 12-14, which as mentioned above executes the pixel-content motion calculation, ICE detection, and offset-angle calculation. The terminal-phase controller 26 processes the resulting optical-flow alignment measurements 25 with the inertial measurement and GPS/INS unit 23 of the vehicle and their data 25, to generate commands 27 for the autopilot 28 of the vehicle during the final phase of flight or other travel. Vehicle-state data 29 are shared with the terminal-phase controller 26 and the guidance unit 22 to allow synchronization of the final few seconds of travel.

Figure 3:
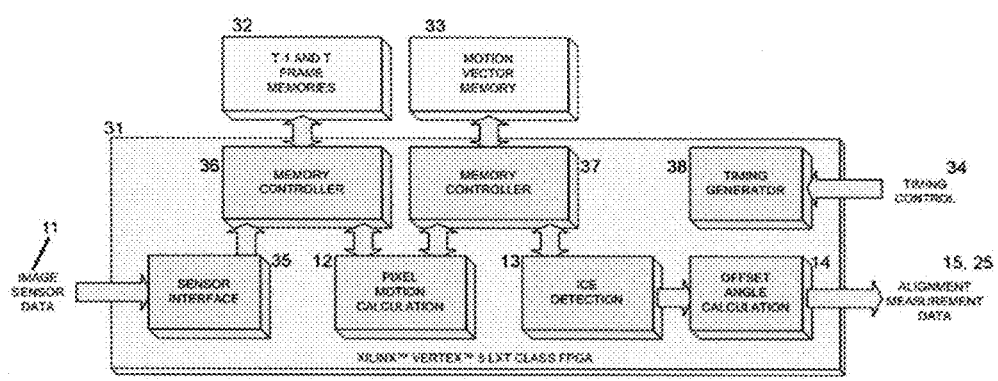
FIG. 3 is a diagram of an optical-flow computation engine.

To perform the three stages of optical-flow computation, real-time processing hardware (typically an FPGA-based module) is required. For example a Xilinx™ Vertex™ 5 LXT class FPGA 31 (FIG. 3) coupled with video-rate memories 31, 32 and their respective controllers 36, 37 is suitable for these steps. Processing is best done by pipelining 35-36-32-12-37-33-13-14 information through the system, performing the computations in parallel as the data become available—rather than bit-by-bit as in a typical software-oriented implementation.

Figure 4:
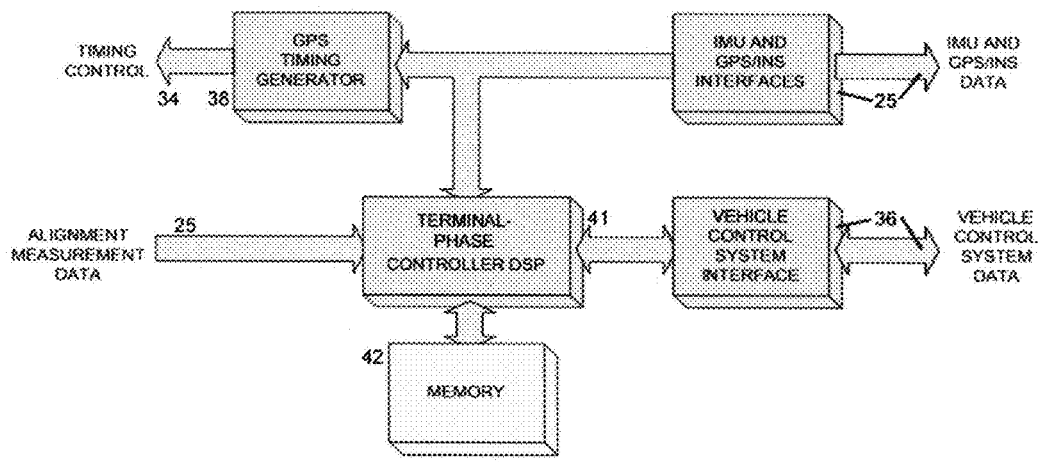
FIG. 4 is a like diagram of a terminal-phase controller.

In preferred embodiments of our invention, the terminal-phase (or, for a weapon, "impact-phase") controller most-typically calls for a conventional processing environment such as a high-speed processor 41 (FIG. 4), for example a digital signal processor ("DSP").

OPTICAL FLOW PERFORMANCE UNDER REALISTIC OPERATING CONDITIONS—To demonstrate the effectiveness of our optical-flow technique, we have created a realistic simulation of data collected under operating conditions of interest. We accomplished this using high-resolution IKONOS satellite imagery to represent what a vehicle might "see" immediately prior to impact. To emulate views from higher altitudes, we spatially downsampled the data, creating larger cell sizes that would appear from higher elevations. Lastly, to model the offset angle between the aim point of the vehicle and the velocity vector, we shifted each frame by a given number of pixels, consistent with the pixel-angle relationship.

To help evaluate our optical-flow solution to this problem, we selected an example set of imaging characteristics. We simulated a 512×512 pixel sensor with a 10° FOV and a 20 Hz frame rate. The sensor was "traveling" 3,000 feet/second toward the ground, beginning at 15,000 feet (FIG. 5*a*) and continuing down to 500 feet. The simulated velocity vector of the camera was offset from the aim point by approximately one degree.

Figures 5A, 5B:
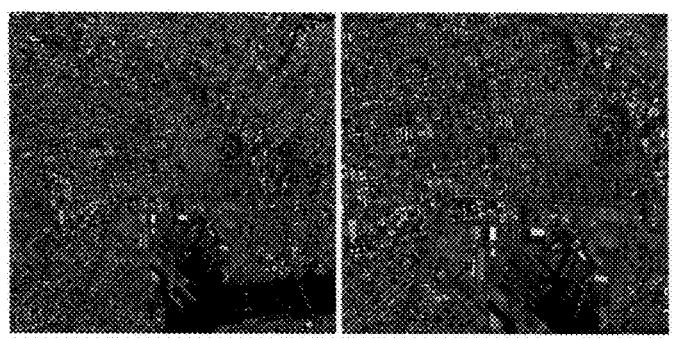
FIG. 5 is a pair of satellite photographic images of a terrestrial area, used in a simulation of a preferred embodiment of our invention—and a simulated view from elevations of (in FIG. 5a) 15,000 feet and (FIG. 5b) 10,000 feet.

Accompanying are an image of an urban environment as seen through the imaging unit at 15,000 feet (FIG. 5*a*), and another less than two seconds later at 10,000 feet (FIG. 5*b*). As the vehicle flies toward the ground, the resolution improves and the image expands. At 10,000 feet we observe 30% finer ground resolution.

The offset of the image center of expansion (ICE) from the center of the optical axis can be easily seen by taking a temporal average of the data. The temporal average clearly shows the smearing (FIG. 6*a*) of each pixel away from the ICE. The ICE can be visually spotted to within a few pixels; however, we want a signal that a detector can easily identify and distinguish from background clutter.

Therefore we calculated the optical-flow field during each time interval (using the Horn & Schunck algorithm described above). We then calculated the magnitude of the flow field between during each interval.

Since the imagery expands away from the ICE, the optical flow will be smallest exactly at the ICE. In our simulation, each flow magnitude had its minimum velocity within a few pixels of the simulated ICE; each such magnitude by itself would yield highly accurate correction calculations.

To obtain even better ICE estimates that improve over time, we performed a temporal average (FIG. 6*b*) of the flow magnitudes. Any random noise appearing in the optical flow washed out, while the signal was reinforced. The minimum of the time-averaged flow field was within one pixel of the simulated ICE, yielding angular accuracy of approximately 0.02°.

GUIDANCE TOWARDS A STATIONARY DESTINATION—We have earlier mentioned situations in which navigation is not available or not suitable to use as a basis for optical-flow guidance or control. Again, in these examples a GPS-guided vehicle may have a bias in its navigation solution, or GPS is denied or degraded, or operators have an image of the desired destination without having any GPS coordinates; or it may suddenly become necessary to suddenly make emergency deliveries of people or supplies to a location seen from the air. These circumstances can be resolved using visual data downloaded into the device—whether created moments earlier, or created from long-existing assets or databases.

As also noted previously, starting from a priori knowledge of a destination in a stored image file, a strapdown imaging sensor can find the angle between the vehicle velocity vector and a vector (called the line of sight, "LOS") from the vehicle to a desired stationary destination in the image.

Additional outputs of our optical-flow invention are used in conjunction with this angle to develop the inertial LOS-rate vector. Specifically, the LOS-rate vector is the angular velocity of that LOS between the vehicle and the destination. Many guidance algorithms are available for applying this LOS-rate measurement to reduce the total miss distance.

Such algorithms are not limited to following the LOS vector (or a vector based on the LOS rate) directly to the destination—an approach most typically used only for an impact at termination. Rather, many commonly known guidance processes include autopilots for bringing vehicles (including aircraft) along a staged and often indirect approach to a gentle and relatively slow termination.

It will also be appreciated that available algorithms are not limited to effectuating an approach to a destination. To the contrary, many known guidance programs are well-suited for avoidance of particular destinations or objects—again, whether by direct route and impact or by indirect approach, rendezvous etc.

Imaging seekers offer the ability to deliver to precisely defined locations, but historically have required expensive, large, gyrostabilized, gimbal mechanisms. This invention duplicates the performance of the gyrostabilized seeker, but is implemented with any standard, low-cost, strapdown imaging sensor. This innovative approach to strapdown-sensor use allows for the advantages of proportional navigation; it can drive miss distance to near zero, without GPS updates, even in the presence of strong crosswinds.

Figure 6A:
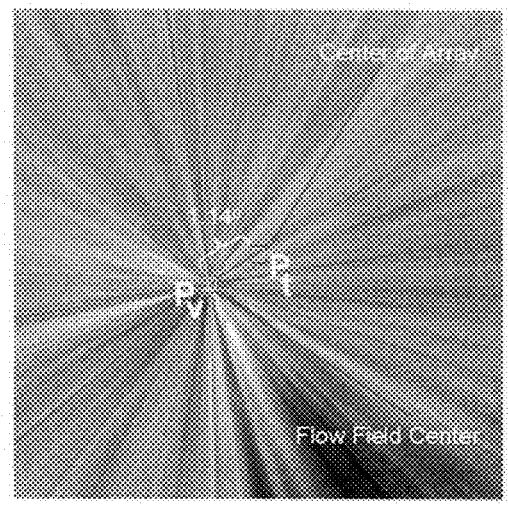
FIG. 6 is a corresponding pair of images made from the images of FIG. 5 and demonstrating optical-flow processing, more specifically (FIG. 6a) accumulated flow exhibiting the relationship between center of a camera array and the flow-field center.
(FIG. 6b) an average of optical-flow imaging exhibiting the flow-field center isolated.
Figure 6B:
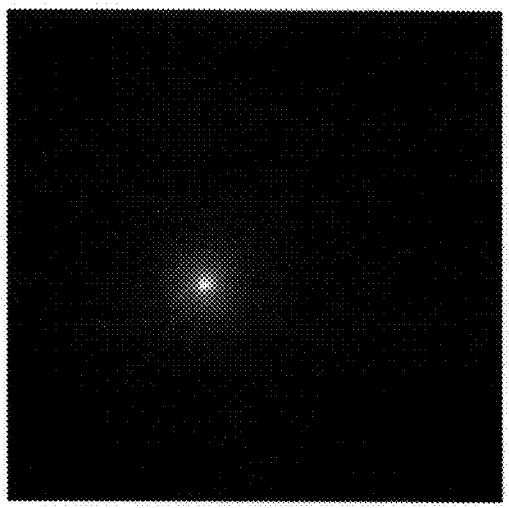
Figure 7A:
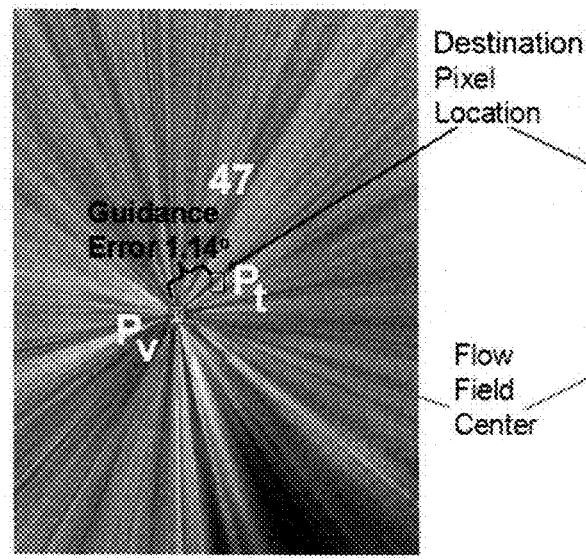
FIG. 7 is another pair of images showing, respectively, (FIG. 7a) velocity-vector projected destination determined from optical flow and (FIG. 7b) desired destination from correlation to a specified onboard reference image.
Figure 7B:
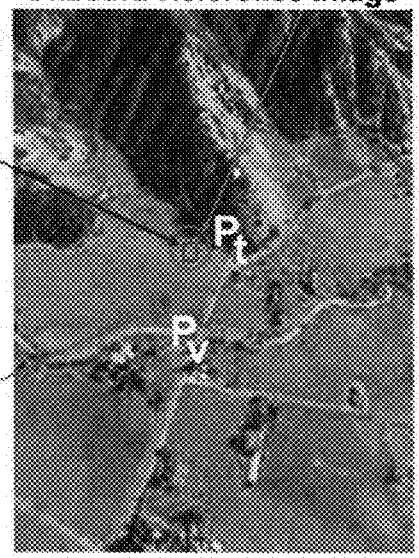

Optical-flow image processing accurately locates the velocity vector or "flow-field center" in the sensor field of view (FIG. 6*a*, left side). The velocity-vector information is next correlated with the strapdown-sensor live image to determine a predicted destination point $P_v$ (FIGS. 6*a*, 7*a*, 7*b*) A target tracker then finds the aim point in the image.

The target tracker, or image-based tracking method, can be chosen from many known such methods and devices. Therefore for any given application naturally a tracking approach can and should be chosen that is best suited for that particular application. The tracker provides the desired destination or "target" location, $P_t$ (FIGS. 6*a*, 7*a*, 7*b*), in the exact same earth-image frame as $P_v$. Thus a guidance error signal 47 (FIGS. 7*a*, 7*b*) is generated. The number of pixels between $P_t$ and $P_v$ is a measure of an angular correction needed to guide the vehicle to the desired destination.

As this approach yields a direct measurement of the angle $(P_t-P_v)$, it is possible to close the guidance loop directly on that error signal. In essence this is steering the velocity vector to be directly on top of the destination point, an arrangement highly suitable for stationary destinations.

In order to avoid the same problems that pursuit navigation has in the presence of crosswinds, the loop controller is best augmented with an integrator. The angle $(P_t-P_v)$ can also be used in the mathematical construction of LOS rate $\sigma'$, the signal more commonly used by terminal homing systems.

Figure 8:
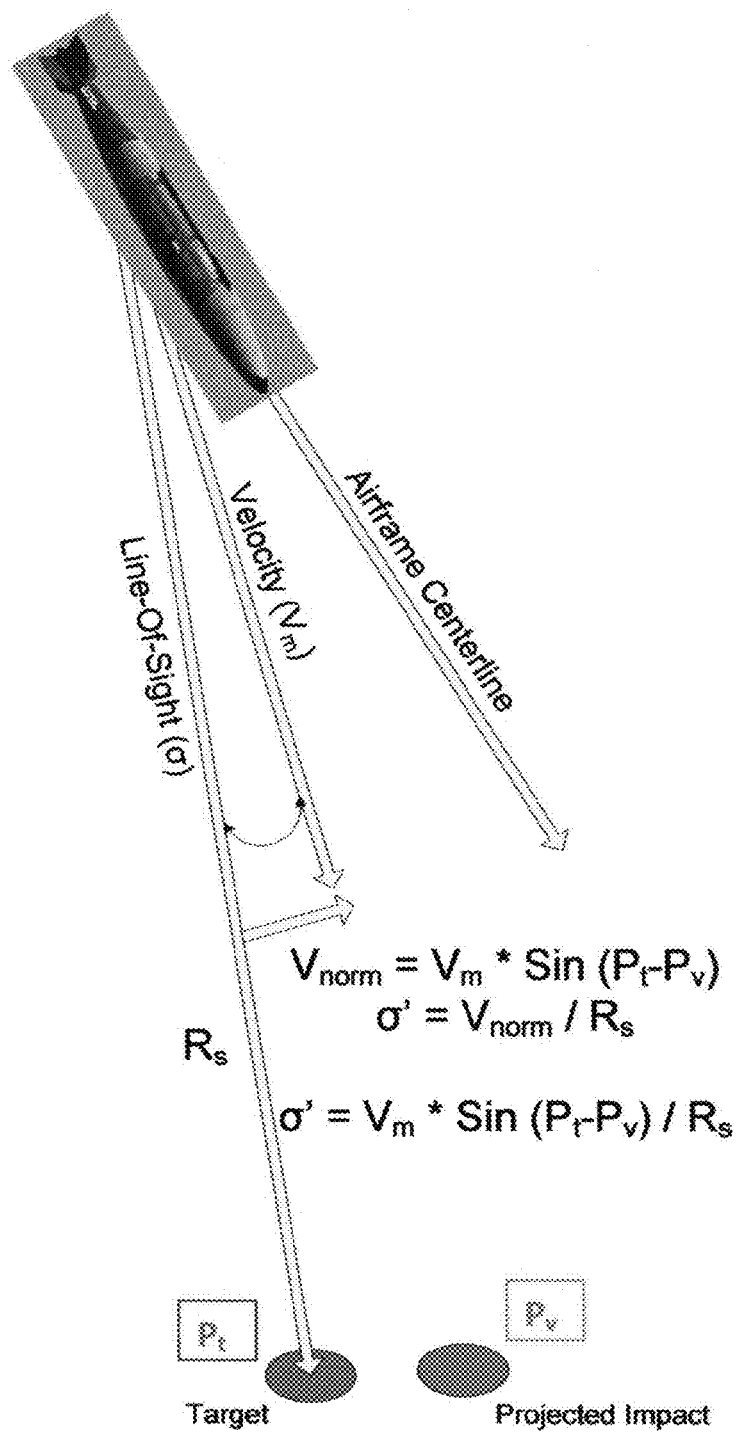
FIG. 8 is a diagram of line-of-sight ("LOS") relationships, shown together with corresponding mathematics.

Our algorithms construct LOS rate from measured values. FIG. 8 includes the single-plane equation used to construct $\sigma'$ from measurements. The angle $(P_t-P_v)$ is found by optical flow and target tracking as previously described. The LOS rate is completed by deriving $V_m/R_s$ from other byproducts of the optical-flow calculation.

Highly successful passive imaging missile systems, such as the military "AIM-9X" and "Hellfire", have robust operational envelopes because they use some variant of proportional navigation. A critical factor in terminal homing systems implementing proportional navigation is the measurement of σ'.

Such known gyrostabilized seekers use their gimbals to closely track their destinations, providing direct electromechanical measurement of LOS rate σ' from the gyroscopic mechanisms. Our invention instead measures σ' strictly through passive imagery from a strapdown camera.

An intercept course can be developed by giving acceleration commands that drive a vehicle to target LOS rate to zero. When it is zero, the vehicle is on a collision course with the destination. The "Proportional Navigation" acceleration command $\underline{A}_{cmd}$ is developed from the base equation:

$$A_{cmd} = NV_c \sigma',$$

where N is the navigation ratio, $\underline{V}_c$ the closing speed, and σ' the measured LOS rate.

Optical-flow output at any given pixel is noisy. Areas of very low contrast can give false zero-velocity readings; however, there is a strong and linear trend for the magnitudes to be larger for pixels farther from the $P_v$ location. Below we display the basic mathematics of the optical-flow calculation.

$$\frac{x}{t} \frac{(x \quad x_{ICE})}{z} \frac{z}{t}$$

$$\frac{y}{t} \frac{(y \quad y_{ICE})}{z} \frac{z}{t}$$

(x, y)=pixel coordinates
($x_{ICE}$, $y_{ICS}$)=ICE location in pixel coordinates The variables x and y are pixel locations defined in the focal-plane array, and z is distance above the ground. The output at each pixel is "range rate divided by range" multiplied by angular distance from the image center of expansion (ICE).

Calculating an average optical-flow output for each column of values across the focal-plane array generates a high-signal-to-noise-ratio estimate of range rate divided by range. The average value of each column equals the output described in the mathematical expressions above.

Upon replacing z with $R_s$, and the partial derivative of z with respect to t with "range rate", we can see that:

///
///

$$\begin{pmatrix} \text{average optical--} \\ \text{flow output} \\ \text{of a column} \end{pmatrix} = \left(\frac{\text{range rate}}{R_s}\right) \cdot \begin{pmatrix} \text{horizontal angle} \\ \text{from the ICE} \end{pmatrix};$$

range rate=$v_m \cdot \cos(P_t - P_v)$; and the slope of the optical flow is $$S_{of} = v_m \cdot \cos \frac{P_t - P_v}{R_s}.$$

Such expressions provide a derivation of all terms needed for the guidance-law algorithms of "Proportional Navigation" (FIG. 8) and thus enable refinement of vehicle-guidance precision.

The foregoing disclosures are intended as exemplary, not to limit the specific forms or operations of our invention.

In certain of the appended apparatus claims, in reciting elements of the invention in the bodies of the claims, the term "such" is used as a definite article—i.e. instead of the word "the" or "said"—but only in cross-references back to elements of the environment or context of the claimed invention that first appear in the claim preambles. The purpose of this convention is to most-clearly point out those environmental or contextual features, so that they are not mistaken for or confused with components of the invention itself.

We claim:

1. A control system, for controlling a vehicle that has a reference axis and that while in motion has a velocity vector, said control system comprising:
   an optical-flow subsystem detecting an angle between such reference axis and such velocity vector; and
   a vehicle orientation-adjustment subsystem responding to the detected angle, to optimize the detected angle.

2. The control system of claim 1, wherein:
   said other subsystem optimizes said angle by adjusting orientation of the reference axis.

3. A control system, for controlling a vehicle that has a reference axis and that while in motion has a velocity vector, said control system comprising:
   an optical-flow subsystem detecting an angle between such reference axis and such velocity vector; and
   another subsystem responding to the detected angle by modifying said angle;
   wherein said other subsystem does not use information from any navigation apparatus or algorithm for responding to the detected angle by modifying said angle.

4. A control system, for controlling a vehicle that has a reference axis and that while in motion has a velocity vector, said control system comprising:
   an optical-flow subsystem detecting an angle between such reference axis and such velocity vector; and
   another subsystem responding to the detected angle by modifying said angle;
   wherein said other subsystem comprises means for providing data from the control system to an autopilot system to guide the vehicle on a terminal path.

5. The control system of claim 4, wherein:
   the terminal path is a specific, precise path.

6. The control system of claim 4, wherein:
   said other subsystem modifies said angle by adjusting orientation of the reference axis.

7. A control system, for controlling a vehicle that has a reference axis and that while in motion has a velocity vector, said control system comprising:
   an optical-flow subsystem detecting an angle between such reference axis and such velocity vector; and
   another subsystem responding to the detected angle by modifying said angle;
   wherein the vehicle comprises a parachute, or another airborne gliding device.

8. The control system of claim 7, wherein the vehicle comprises one or more of:
   a paratrooper or rescue dog, or other living being; and
   a module for carrying a payload.

9. The control system of claim 7, wherein:
   said other subsystem modifies said angle by adjusting orientation of the reference axis.

10. A guidance system, for controlling a vehicle that has a destination and that while in motion has a velocity vector, said guidance system comprising:
    an optical-flow subsystem detecting an angle between such velocity vector and a line of sight to such destination; and a vehicle trajectory-adjustment subsystem responding to the detected angle, to modify the velocity vector so as to optimize the detected angle.

11. The guidance system of claim 10, wherein:
the trajectory-adjustment subsystem does not use information from any navigation apparatus or algorithm for responding to the detected angle, to modify the velocity vector so as to optimize the detected angle.

12. The guidance system of claim 10, wherein the trajectory-adjustment subsystem comprises:
means for minimizing the detected angle.

13. The guidance system of claim 10, wherein the trajectory-adjustment subsystem comprises:
means for applying information from a navigation unit or algorithm, in optimizing the detected angle.

14. The guidance system of claim 10, wherein the vehicle has a mission of destruction or rendezvous or avoidance, or any other particular type of mission, and the trajectory-adjustment subsystem comprises:
means for modifying the vector to provide a path to the destination.

15. The guidance system of claim 14, particularly for use while such vehicle approaches such destination, and wherein the optical-flow subsystem comprises:
an imaging unit secured to the vehicle; and
means for causing the imaging unit to form a succession of images of such destination; and
means for receiving and analyzing the succession of images.

16. The guidance system of claim 15, wherein the imaging unit comprises one or more of:
a camera;
a radar, lidar or ladar module; or an IR imager or other electrooptical imager; and
a sonar module.

17. The guidance system of claim 10, wherein:
the vehicle comprises a controlled-movement device such as a parachute or another airborne gliding device.

18. The guidance system of claim 17, wherein the vehicle comprises one or more of:
a paratrooper or rescue dog, or other living being; and
a module for carrying a payload.

19. The guidance system of claim 10, particularly for use as such vehicle approaches a destination region, and wherein the optical-flow subsystem comprises:
an imaging unit secured to the vehicle;
means for causing the imaging unit to form a succession of images of such destination region; and
means for receiving and analyzing the succession of images.

20. The guidance system of claim 19, wherein: the imaging unit comprises a camera.

21. The guidance system of claim 19, wherein the imaging unit comprises one or more of:
a radar, lidar or ladar module; or a sonar module; or an IR imager or other electrooptical imager.

22. The guidance system of claim 19, wherein the receiving means comprise one or more of:
a multipurpose digital processor;
a field-programmable gate array; and
analog circuits.

23. The guidance system of claim 10, particularly for an airborne vehicle and further comprising: an autopilot controlled by the orientation-adjustment subsystem.

24. The guidance system of claim 10, particularly for an airborne vehicle that is a penetrating munition, and wherein: the orientation-adjustment subsystem extends depth of penetration of the munition.

25. The guidance system of claim 10, particularly for a ground vehicle and further comprising: an autopilot controlled by the orientation-adjustment subsystem.

26. A guidance system, for controlling a vehicle that operates in relation to another object or to a particular undesired destination, and that while in motion has a velocity vector, said guidance system comprising:
an optical-flow subsystem detecting an angle between such velocity vector and a line of sight to such other object or particular destination; and
a vehicle trajectory-adjustment subsystem responding to the detected angle, to modify the velocity vector so as to optimize the detected angle for avoidance of the other object or particular undesired destination.

27. A guidance system for guiding a vehicle that is under engineering development or testing, or both; or that is for operation with an autopilot or a guidance algorithm, or both; or is under combinations of these circumstances; and that while in motion has a velocity vector, said guidance system comprising:
an optical-flow subsystem detecting an angle between such velocity vector and a line of sight to another object, or to a particular destination that is either desired or to be avoided; and
another subsystem responding to the detected angle—to report or modify, or both, the velocity vector so as to:
optimize the detected angle for real-time measurement input to improve performance and robustness of such autopilot or such guidance algorithm, or both, or guide such engineering development or testing of air vehicles, or both.

28. A control system, for controlling a vehicle that has a reference axis and that while in motion has a velocity vector, said control system comprising:
an optical-flow subsystem detecting an angle between such reference axis and such velocity vector; and
another subsystem responding to the detected angle, to modify said angle.

29. The control system of claim 28, wherein:
the reference axis is a centerline of the vehicle.

30. The control system of claim 28, wherein:
said other subsystem comprises means for minimizing the detected angle.

31. The control system of claim 28, wherein:
said other subsystem comprises means for adjusting the detected angle to a specific value or range of values.

32. The control system of claim 28, particularly for use as such vehicle approaches a destination region, and wherein the optical-flow subsystem comprises:
an imaging unit secured to the vehicle;
means for causing the imaging unit to form a succession of images of such destination region; and
means for receiving and analyzing the succession of images.

33. The control system of claim 32, wherein:
the imaging unit comprises a camera.

34. The control system of claim 32, wherein the imaging unit comprises one or more of:
a radar, lidar or ladar module; or a sonar module; or an IR imager or other electrooptical imager.

35. The control system of claim 32, wherein the receiving means comprise one or more of:
a multipurpose digital processor;
a field-programmable gate array; and
analog circuits.

36. The control system of claim 28, particularly for an airborne vehicle and further comprising:
an autopilot controlled by the other subsystem.

37. The control system of claim 28, particularly for an airborne vehicle that is a penetrating munition, and wherein:
said other subsystem extends depth of penetration of the munition.

38. The control system of claim 28, particularly for a ground vehicle and further comprising:
an autopilot controlled by said other subsystem.

39. The control system of claim 28, wherein:
said other subsystem modifies said angle by adjusting orientation of the reference axis.

40. The control system of claim 28, wherein:
said other subsystem also comprises means for recording the detected angle, or transmitting the detected angle, or both.

\* \* \* \* \*